Figure 4:
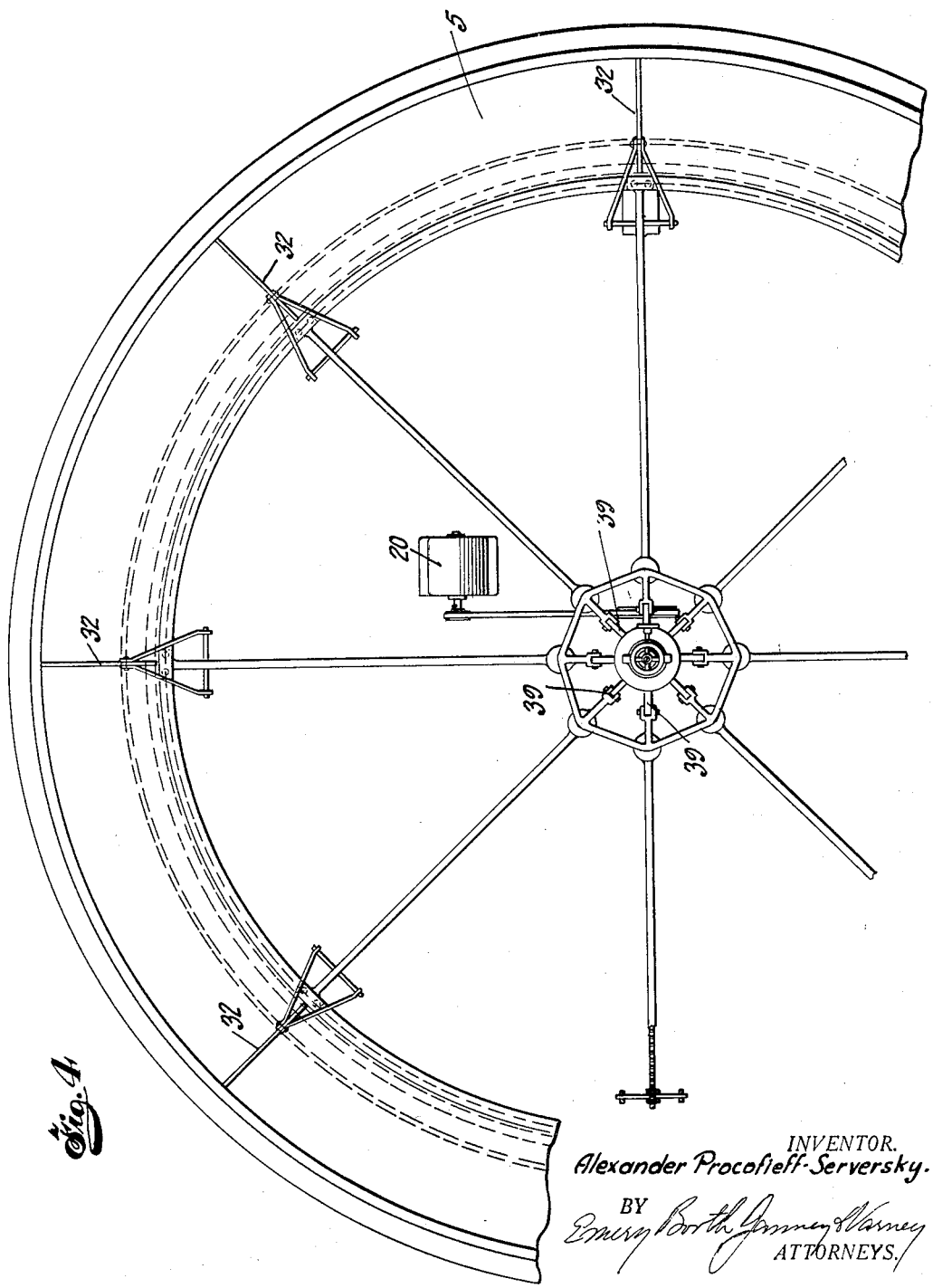

March 27, 1934. A. PROCOFIEFF-SEVERSKY 1,953,045
TESTING APPARATUS
Original Filed April 3, 1926  4 Sheets-Sheet 1
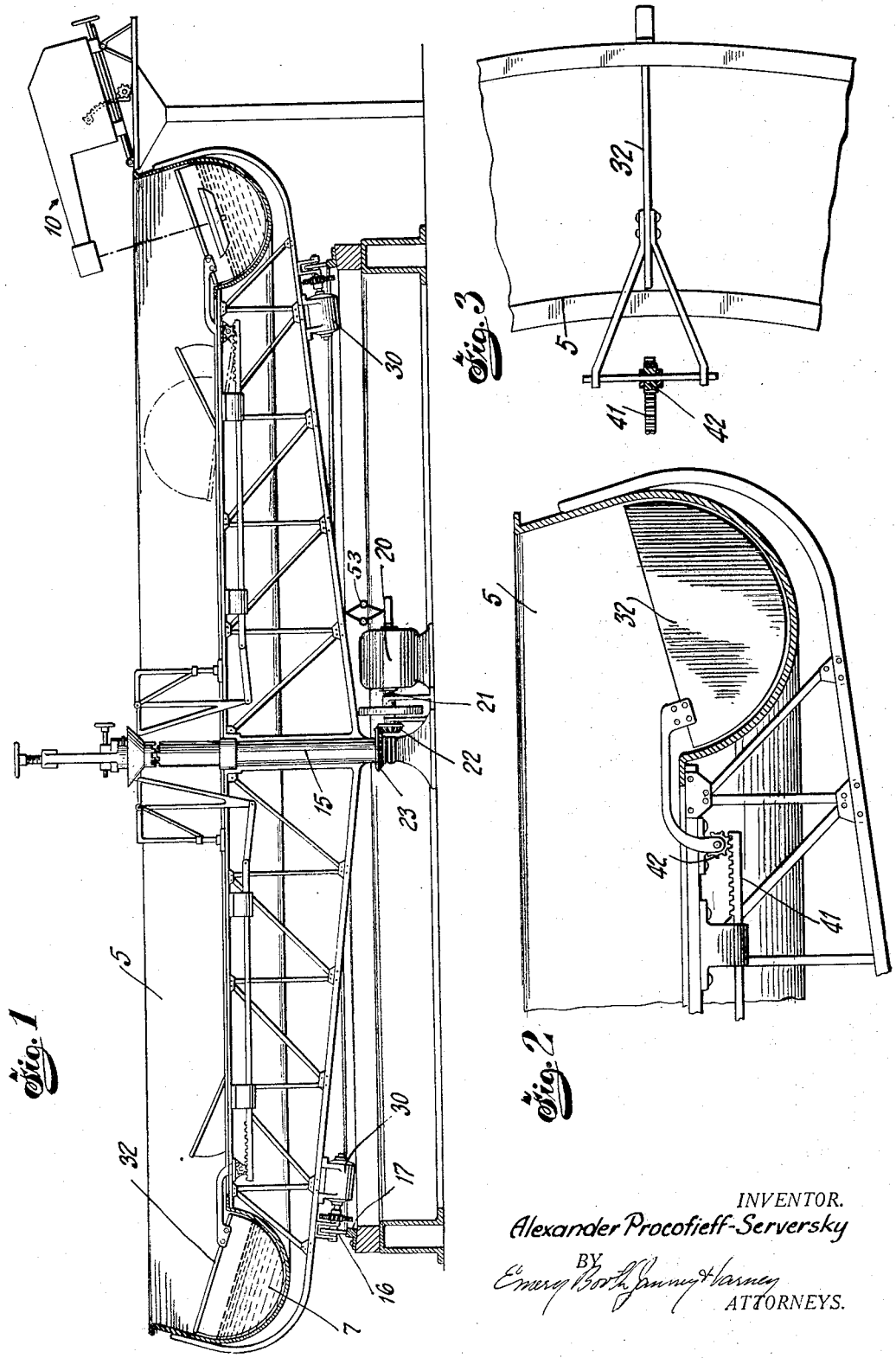
INVENTOR.
Alexander Procofieff-Serversky
BY
ATTORNEYS.

March 27, 1934.  A. PROCOFIEFF-SEVERSKY  1,953,045
TESTING APPARATUS
Original Filed April 3, 1926  4 Sheets-Sheet 2

INVENTOR.
Alexander Procofieff-Serversky.
BY
ATTORNEYS.

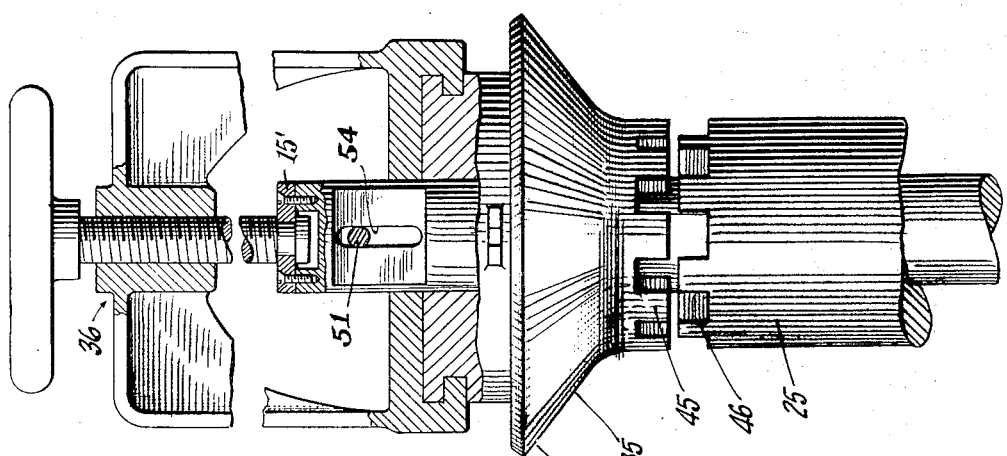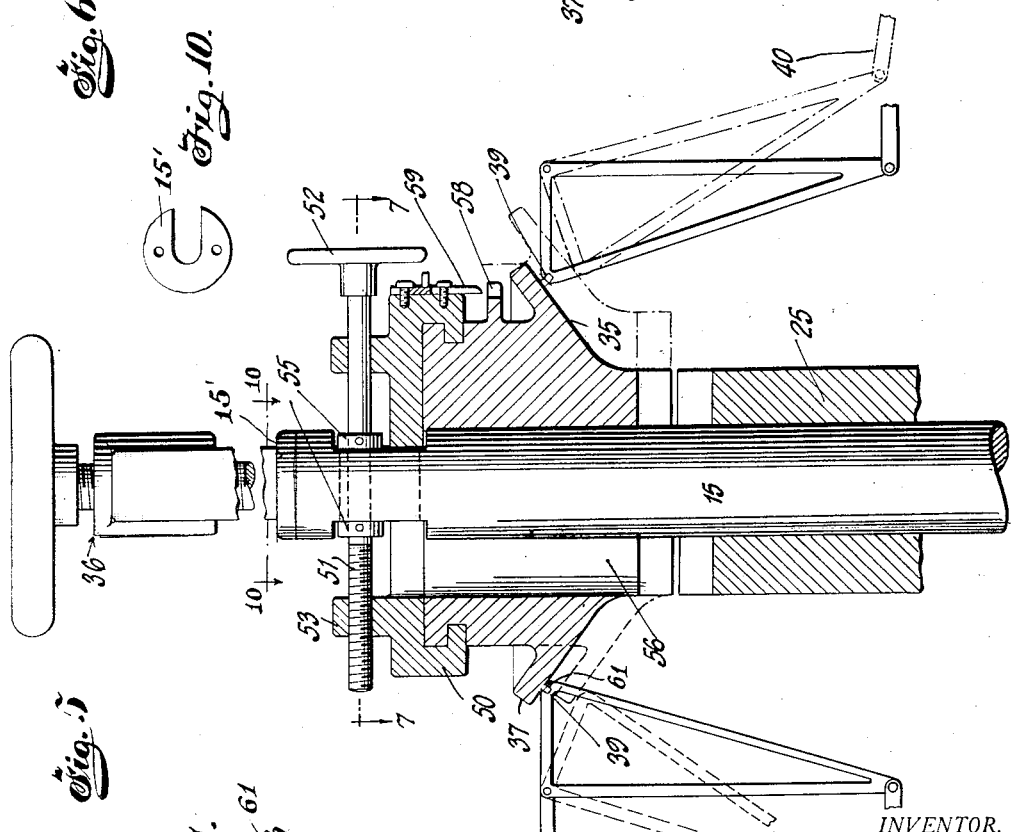

March 27, 1934.  A. PROCOFIEFF-SEVERSKY  1,953,045
TESTING APPARATUS
Original Filed April 3, 1926  4 Sheets-Sheet 4
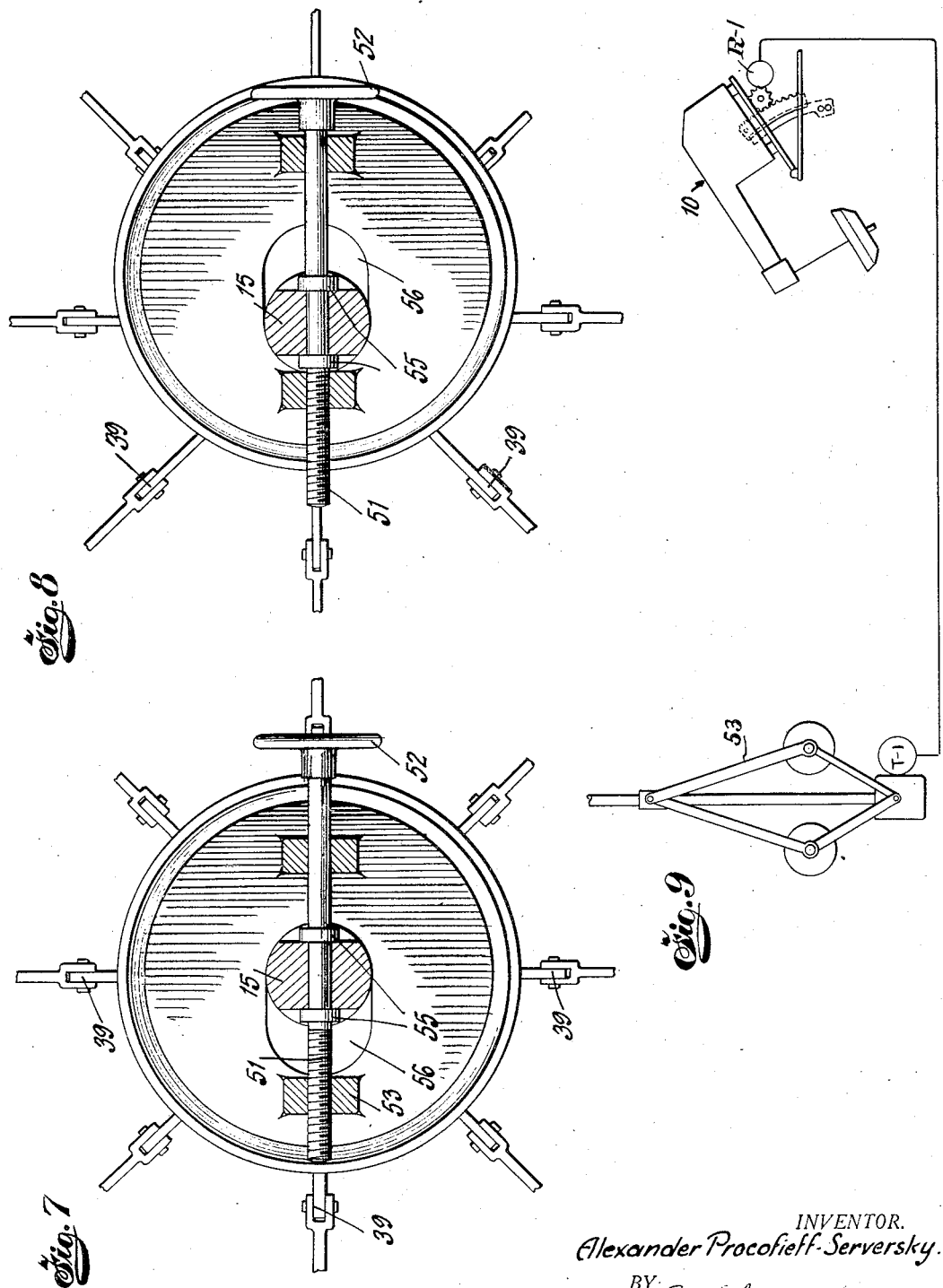
INVENTOR.
Alexander Procofieff-Serversky.
BY
Emery Booth, Janney & Varney
ATTORNEYS.

Patented Mar. 27, 1934

1,953,045

UNITED STATES PATENT OFFICE 1,953,045

TESTING APPARATUS

Alexander Procofieff-Seversky, New York, N. Y., assignor, by mesne assignments, to Seversky Aircraft Corporation, a corporation of Delaware Application April 3, 1926, Serial No. 99,487
Renewed May 9, 1933

16 Claims. (Cl. 265—1)

The present invention relates to apparatus for testing the effect or various apparatus of movement through or on water and has for an object to provide apparatus in the use of which the conditions of normal operation of the device to be tested can be simulated.

The invention has been developed in connection with the designing of apparatus for testing the effect of movement through water on the pontoons of airplanes and for convenience of description will be described with more particular reference to its application to apparatus of this character but it will be understood that this description is illustrative merely and is not intended as defining the limits of the invention.

In practice, apparatus for testing the effect of movement relative to water on pontoons, boats, and other apparatus have been generally of two types, one in which the apparatus to be tested is moved relative to the water and the second type that in which the water is caused to flow at a predetermined speed in a suitable channel and the apparatus to be tested is held relatively stationary. Apparatus of both types have obvious disadvantages. In apparatus in which the water is caused to flow in a channel, the velocity of the water differs at different points in the cross section of the channel on account of the frictional resistance.

The present invention has for an object to provide an improved apparatus in which the velocity of the water will be the same at all points engaging the apparatus to be tested.

In the particular apparatus illustrated, the path of movement of the water is circular and the apparatus comprises a rotatable support having a trough shaped circular container for the water, the device being arranged to be rotated at the desired speed. Means is provided for maintaining the device to be tested in predetermined position relative to the moving body of water. The water and container move at substantially the same velocity and the water therefore moves at substantially the same velocity at all points in the cross section of the trough.

The nature and objects of the invention will be better understood from a consideration of a particular embodiment thereof, reference being had to the accompanying drawings forming a part hereof and in which:

Figure 1 is a central cross sectional view somewhat diagrammatical in character of an apparatus embodying the principles of the invention;

Fig. 2 is an enlarged detail view showing the gate, Fig. 3 is a plan view of the same, Fig. 4 is a plan view of the apparatus, Fig. 5 is a detail central sectional view of the central operating cam, Fig. 6 is a central sectional view taken in a plane at right angles to the plane of Fig. 5, Fig. 7 is a horizontal sectional view taken on the line 7—7 of Fig. 5, Fig. 8 is a similar horizontal sectional view but showing the parts in a different position, Fig. 9 is a diagrammatic view indicating the connection between the governor and the dynamometer, Fig. 10 is a sectional view taken on the line 10—10 of Fig. 5 showing the slot in the plate 15′, and Fig. 11 is an enlarged detail view showing one of the anti-friction rollers 61.

In the apparatus shown for the purposes of illustrating the principles of the invention, provision is made for moving the body of water together with the container for the water at a predetermined speed and for maintaining the apparatus to be tested at a predetermined position relative to the water, provision being also made for measuring the effect on the device of the movement of the water relative thereto. The apparatus particularly shown in the drawings comprises a rotatable support 5 arranged to carry a body of water 7 which will partake of the movement of the support. In order that the body of water may be of as little weight as possible an annular trough is formed peripherally of the support, this trough being of sufficient width to receive the device to be tested therein in desired relation to the water. The device to be tested is maintained in desired position relative to the water by suitable means which may comprise, for example, a dynamometer 10 constructed and arranged to permit measurement of the forces acting upon the device to be tested in each of several directions.

The support 5 is rotatable about a central column 15 non-rotatably secured in a suitable base and may be supported by suitable wheels 16 engaging an annular track 17. The support may be rotated by means of a motor 20 belt connected to a shaft 21 having a bevel gear 22 meshing with a cooperating bevel gear 23 secured to a sleeve shaft 25 forming a part of the support.

Motors 30 may also be provided for driving some or all of the wheels 16 which support the device upon the track 17 if desired.

Means may be provided to cause the water in the trough to move therewith and to prevent movement of the water relative to the trough during the acceleration of the rotation of the support or as the result of the resistance between the water and the device being tested. In the illustrated structure, gates 32 are provided at different points along the trough, these gates being movable to and from operative position to avoid interference with the device being tested.

The means for moving these gates is indicated diagrammatically as comprising a cam 35 movable vertically on the non-rotatable column 15 and also movable horizontally relative thereto. When the cam is moved vertically downward on the column 15 as by means of the screw and nut mechanism 36 the cam surface 37 engages the inner ends of the levers 39 operating the same simultaneously to lift the gates through suitable mechanism such as the links 40 connected to the lower ends of the levers 39, rack rods 41, and pinions 42. Preferably, means is provided for causing the cam 35 to rotate with the support during this operation of the gates.

As shown, jaws 45 and 46 are provided on the lower end of the cam 35 and the upper end of the sleeve shaft 25, the arrangement being such that as the cam moves downwardly the jaws engage causing the cam to rotate with said sleeve.

Provision preferably is also made for operating the gates successively in a manner to lift each gate out of operative position as it passes the point at which the device to be tested is positioned. For the purpose of such operation, means is provided for moving the cam 35 to an eccentric position. As indicated diagrammatically, the cam 35 is embraced by a collar 50, which collar may be moved laterally by means of a screw 51 to which a hand wheel 52 is secured, this screw extending through a nut 53 and being held against longitudinal movement relative to the column 15 by means of collars 55 rigidly secured to the screw shaft 51 and engaging flattened portions on the column 15. In order that the screw shaft 51 may not interfere with the vertical movement of the cam 35, the screw shaft extends through a slot 54 in the column 15. In order to permit the lateral movement of the screw 51 and the yoke in which it is carried relative to the column 15, the plate 15' which connects the screw and shaft is slotted as indicated in Fig. 10. In one position of rotation the lateral adjustment of the cam is thus possible.

The cam 35 is provided with a central slot 56 through which the column 15 extends, which slot permits lateral movement of the cam when in one rotative position. In order that the cam 35 may be brought to this position, a lug 58 is provided on the cam and a cooperating stop 59 is arranged on the non-rotatable collar 50. When it is desired to adjust the cam to the eccentric position it is first rotated to the position in which the stops engage and then moved laterally. The levers 39 will then be operated successively as the corresponding gates approach the position of the device to be tested. The friction between the ends of the levers and the cam 35 is reduced by the provision of rollers 61 on the levers.

When the tank is rotating at relatively high speed the centrifugal force will cause the surface of the water in the trough to lie at an angle to the horizontal and it may be desirable to correspondingly adjust the dynamometer so that the supporting arm will lie parallel to the surface of the water in the trough rather than in a true horizontal plane. The dynamometer may be adjustably mounted in any suitable way. As shown, it is mounted in arcurate ways so constructed and arranged that as it is adjusted to different positions the distance from the end of the supporting arm to the surface of the water will remain substantially the same, if desired, means may be provided for shifting the position of the dynamometer on the arcuate ways automatically by means controlled by the speed of rotation of the tank. In the apparatus illustrated a governor 53 is connected to the driving motor and a repeater mechanism comprising a transmitter T—1 connected to the governor and a repeater R—1 connected to the dynamometer is arranged to move it on the ways.

The transmitter repeater arrangement may be of any suitable type, several of which are commonly used in gun fire control systems as used on battleships and elsewhere as well as in other devices. See, for example, the patents to Meitner #1,392,959, Kaminski #1,555,291, and Barkhausen et al. #1,123,067 and British patents to Justice #15,475A, July 30, 1901 and Thiermann #22,307, Nov. 5, 1901.

It will be understood that various changes in the embodiment illustrated may be made and other embodiments of the invention may be developed without departing from the spirit of the invention.

I claim:

1. In apparatus for testing the resistance of a body to movement through the water, in combination, a tank, means for moving said tank at high speed, means for maintaining a device to be tested in relatively fixed position relative to said moving tank at one side of said tank, and means for measuring the pull on said device, substantially as described.

2. In apparatus for testing the resistance of a body to movement through the water, in combination, a tank adapted to hold water and means for moving the same at high speed, a dynamometer in fixed position having means to maintain a device to be tested in predetermined position in engagement with the water in said tank at one side thereof and to measure the resistance of the device to be tested to relative movement between said device and the water in the tank, substantially as described.

3. In apparatus of the character described, in combination, a rotatable tank adapted to contain water for testing the effect of movement of a device through water comprising means for moving the water and tank wall at a predetermined speed relative to the device to be tested, means for sustaining the device to be tested in fixed position eccentric to said rotatable tank including means for measuring the pull on the device to be tested.

4. In apparatus for testing the resistance of a body to movement through the water, in combination, a rotatable tank, a dynamometer in fixed position having means to maintain a device to be tested in said tank in position to engage water therein at one side thereof, and means for rotating said tank at a predetermined speed relative to said dynamometer to test the pull of the water in the tank on said device, substantially as described.

5. In apparatus for testing the resistance of a body to movement through the water, in combination, an annular tank adapted to contain water, means for rotating said annular tank about the axis thereof and means for causing water in said tank to move with said tank at the speed of the tank comprising projecting gates and means for projecting and retracting said gates, substantially as and for the purposes described.

6. In apparatus for testing the resistance of a body to movement through the water, in combination, a rotatable annular tank adapted to contain water, means for supporting a device to be tested in position to engage the water in said tank, radially positioned gates arranged to resist movement of water circumferentially with respect to said tank and means for moving said gates from operative position during the passing of said device to be tested.

7. In apparatus for testing the resistance of a body to movement through the water in combination, a rotatable annular tank adapted to contain water, means for supporting a device to be tested in position to engage water in said tank, radially positioned gates arranged to resist movement of the water circumferentially with respect to said tank and means for moving said gates from operative position as they approach the device to be tested in the rotation of the tank and for retracting the same to operative position after passing said device.

8. In apparatus of the character described, in combination, a rotatable tank adapted to contain water, radially positioned gates arranged to resist movement of the water circumferentially with respect to said tank, and means for moving said gates from operative position as they approach a predetermined point in the rotation of the tank and for returning the same to operative position after passing said predetermined point.

9. In apparatus of the character described, in combination, a rotatable tank adapted to contain water, a series of gates positioned to cause water in said tank to rotate therewith, means for moving said gates to and from operative position comprising a cam adjustable to one position to operate said gates simultaneously and adjustable to a second position to operate said gates consecutively.

10. Apparatus of the character described comprising, in combination, a rotatable tank comprising an annular trough concentric with the axis of rotation of said tank, and means to rotate said tank together with means for maintaining a device to be tested in relatively stationary position and in predetermined position relative to the free surface of and engaging the water in said trough.

11. In apparatus of the character described, in combination, a rotatable tank adapted to contain water, a dynamometer for maintaining a device to be tested in predetermined position relative to the surface of the water in said tank, and means for shifting the position of said dynamometer in accordance with the speed of rotation of said tank.

12. In apparatus for testing the resistance of a pontoon or the like to movement through the water, in combination, a rotatable tank having an annular trough concentric with the axis of rotation thereof, means for supporting the pontoon to be tested in position to engage the surface of the water in said trough and means for measuring the resistance to relative movement between the pontoon and water in said tank, substantially as described.

13. In apparatus for testing the resistance of a pontoon or the like to movement through water, in combination, a rotatable tank, means for supporting the pontoon to be tested in position to engage the surface of water in said tank, means for rotating the tank to cause the water therein to pass said pontoon at predetermined speeds, and means for measuring the resistance between the pontoon and the water in said tank.

14. In apparatus for testing the resistance of a body to movement through the water, in combination, a rotatable tank, means for maintaining a device to be tested in relatively fixed position relative to said tank at a distance from the center of rotation which is large as compared with the size of the device to be tested.

15. Apparatus of the character described comprising, in combination, a rotatable tank adapted to contain water, means for inhibiting the movement of the water relative to said tank, means for supporting a pontoon or the like in engagement with the water in said tank and for measuring the pull of the water thereon, substantially as described.

16. In apparatus for testing the resistance of a body to movement through the water, in combination an annular trough, means for rotating said annular trough, means for inhibiting movement of the water along said trough and means for supporting a device to be tested in contact with the water in said tank, substantially as described.

ALEXANDER PROCOFIEFF-SEVERSKY.